July 7, 1964 H. A. SCHAEFER 3,139,975
DEVICE FOR CLEANING ENDLESS CONVEYORS
Filed Dec. 4, 1961 2 Sheets-Sheet 1
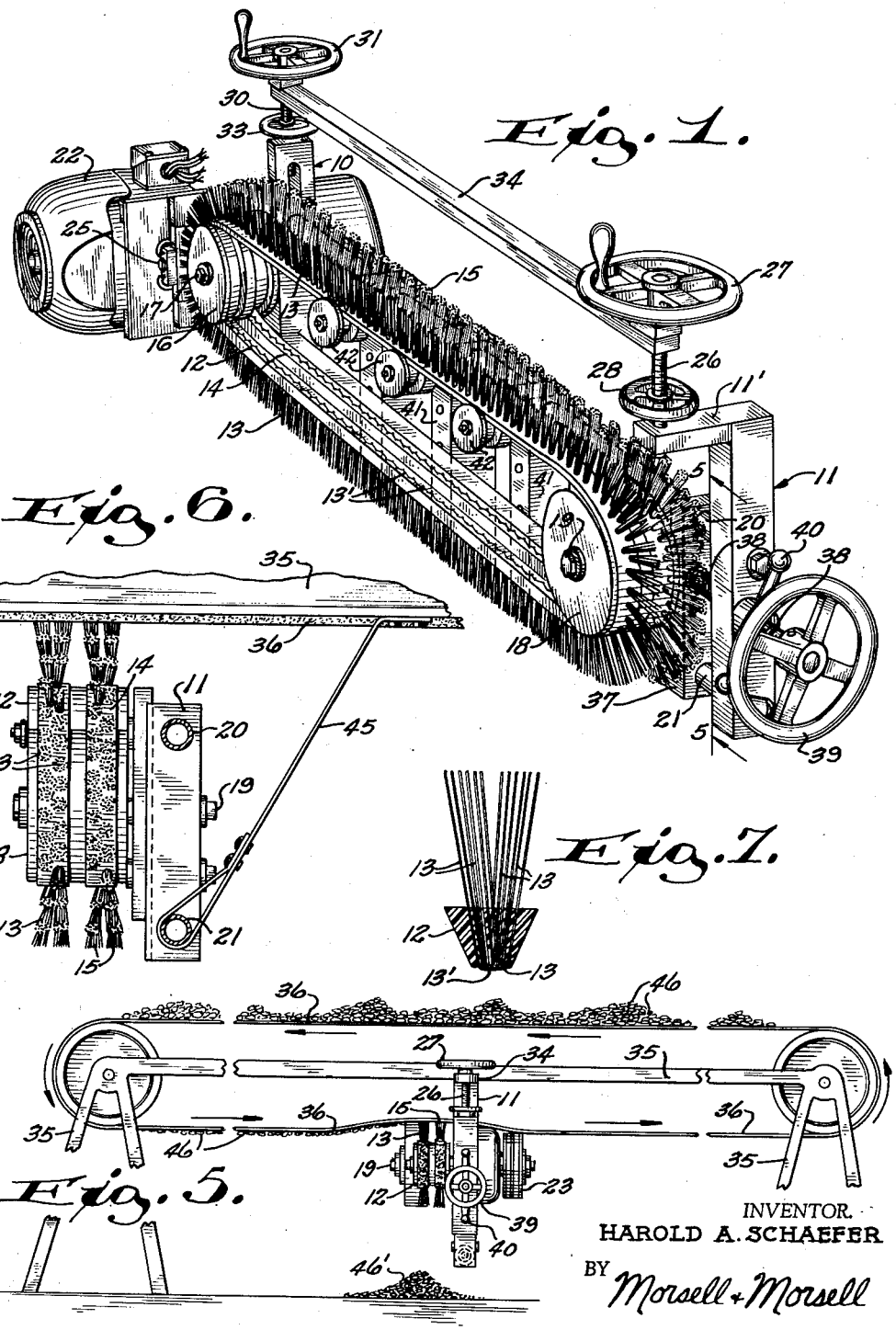
INVENTOR.
HAROLD A. SCHAEFER
BY Morsell + Morsell
ATTORNEYS.

July 7, 1964 H. A. SCHAEFER 3,139,975
DEVICE FOR CLEANING ENDLESS CONVEYORS
Filed Dec. 4, 1961 2 Sheets-Sheet 2
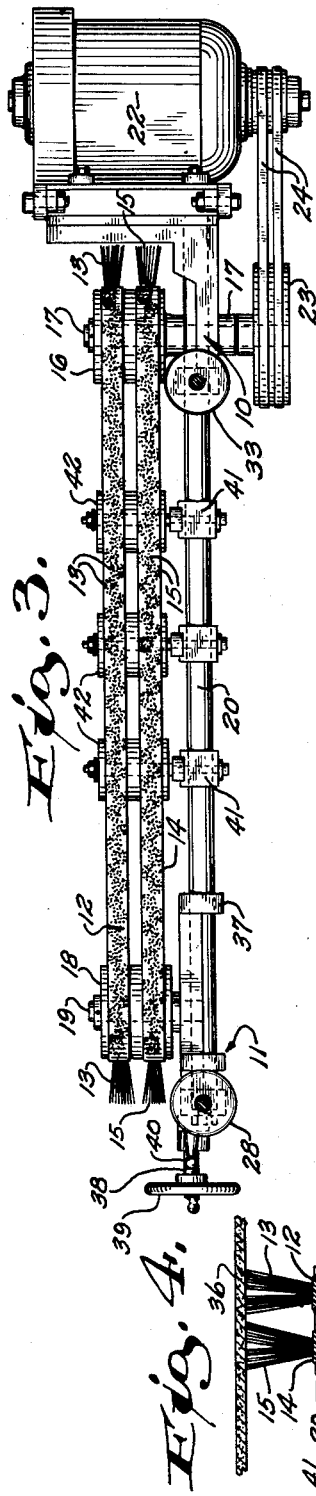
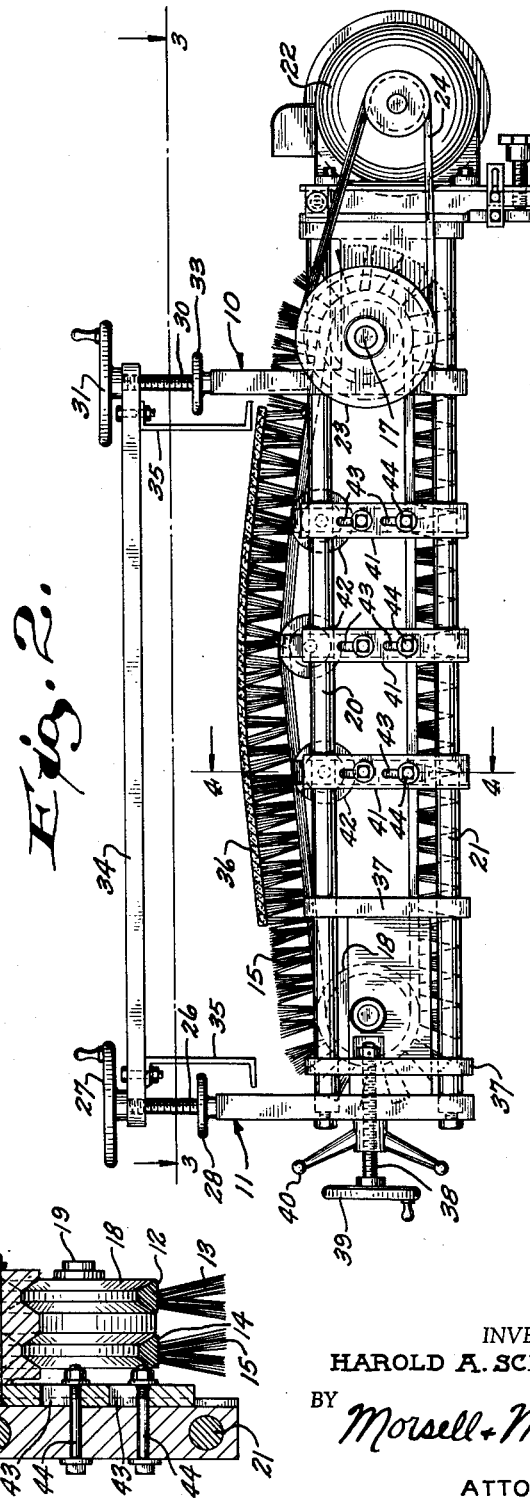
INVENTOR.
HAROLD A. SCHAEFER
BY *Morsell + Morsell*
ATTORNEYS.

United States Patent Office 3,139,975
Patented July 7, 1964

3,139,975
DEVICE FOR CLEANING ENDLESS CONVEYORS
Harold A. Schaefer, Brookfield, Wis., assignor to Schaefer Brush Mfg. Co., Inc., Milwaukee, Wis., a corporation of Wisconsin
Filed Dec. 4, 1961, Ser. No. 156,709
2 Claims. (Cl. 198—230)

This invention relates to an improved device for cleaning endless conveyors, and more particularly to a novel machine which is designed to automatically and continuously clean such a conveyor while the same is in operation.

Normally, when belt or slat type endless conveyors are used in mining or similar operations for moving ore or other bulk material, a substantial quantity of said material adheres to the surface of the conveyor belt, the abrasive action of which residual matter is not only harmful to the belt, but which matter frequently fouls or causes damage to the conveyor driving mechanism. For this reason, attempts have been made in the past to design a device for cleaning such conveyors, but unfortunately such prior devices have proven unsatisfactory for their intended purpose. Most of such prior cleaning units employ rigid scraper blades which are ineffective as cleaners and which frequently merely compress the residual matter into the fabric, or they employ stationary rotary brushes, which disperse the matter in all directions, thereby creating a mess and an unhealthy contamination of the air, and which brushes are subject to rapid wear because of their stationary nature. Still other conventional belt cleaners are so designed that it is necessary to halt the conveyor during the cleaning operation, which results in costly delays or "down time."

With the above considerations in mind, the general objects of the present invention are to provide a novel apparatus for cleaning endless conveyors which is adapted to do a more thorough cleaning job than the devices presently in use, which is more sanitary, which will not damage the conveyor, and which cleaning device can be used while the conveyor is in operation.

A more specific object of the present invention is to provide a cleaning apparatus for endless conveyors of the type used extensively in coal and iron mines, lumber mills, sugar refineries, quarries, and countless similar operations, which apparatus itself utilizes endless, flexible moving members, positioned transversely of the conveyor belt, said movable cleaning members preferably being in the form of V-belts having a multitude of brushes mounted therein, and the transverse pressure thus applied functioning to overcome the adhesion forces maintaining the residual material on said conveyor belt.

A further specific object is to provide a machine for cleaning endless conveyors as described, wherein the flexible nature of the traveling endless cleaning members minimizes the possibility of their damaging the conveyor belt, and also permits said cleaning members to conform to the normally bowed or convexed form assumed by the conveyor belt, thus ensuring a more thorough cleaning job than that provided by the rigid blades or brushes heretofore employed.

A further specific object of the invention is to provide a cleaning apparatus employing endless V-belts for the purpose described, thus obtaining the positive drive characteristics of such belts and promoting the efficiency and effectiveness of the unit.

A further object is to provide a cleaning apparatus utilizing endless V-belts having a multitude of brushes formed therein as described, wherein the mounting of said V-belts is such that the same can be quickly and easily removed and replaced in the event of damage, or when the brushes become too worn for use.

A further object is to provide a novel cleaning apparatus which can be quickly and easily adjusted for use with endless conveyors of varying heights and sizes, and wherein the tension on the V-belts can be adjusted to obtain the best possible cleaning action with respect to the particular conveyor.

A further object is to provide a novel cleaning apparatus that engages the endless conveyor belt at a single location and wherein the dust or other residual substance cleaned from said belt is deposited at a single point on the ground therebelow, where it can be easily collected and removed.

Still further objects of the present invention are to provide a novel cleaning apparatus for the purpose described, which apparatus is relatively inexpensive in design, economical to operate, and which is of a durable construction, well adapted to withstand the heavy strain and rugged use for which it is intended.

With the above and other objects in view, the invention consists of the improved machine for cleaning endless conveyors, and all of its parts and combinations as set forth in the following specification and claims, and all equivalents thereof.

In the accompanying drawings, illustrating the preferred form of the invention, and wherein like reference numerals designate the same parts in all of the views:

FIG. 1 is a perspective view of the complete machine comprising the present invention;

FIG. 2 is a side elevational view of the invention in operative position relative to an endless conveyor belt;

FIG. 3 is a top elevational view of the machine, taken along line 3—3 of FIG. 2;

FIG. 4 is a vertical sectional view taken along line 4—4 of FIG. 2;

FIG. 5 is an end view of the cleaning device in operative position relative to an endless conveyor;

FIG. 6 is a fragmentary end view of the invention, showing the adjustment and stabilizing means incorporated therein; and FIG. 7 is a sectional view through one of the V-belts employed in the invention, showing the mounting of the brushes therein.

Referring now more particularly to FIGS. 1, 2, and 3 of the drawings, it will be seen that the machine comprising the present invention includes an elongated, unitary frame having an upstanding end member 10 and an opposite end member 11, said end members being supported by a pair of vertically-aligned longitudinal crossbars 20 and 21 which are connected to and extend between said end members. Said frame is preferably formed of heavy gauge steel in order to provide a rugged and durable piece of equipment adapted for heavy duty use in mines, quarries, lumber mills and the like, as will be hereinafter described.

Movably carried by and between said end members 10 and 11, in spanning relationship thereto, are a pair of parallel and adjacent V-belts 12 and 14, having rows of brushes 13 and 15 mounted thereon, respectively. Said V-belts 12 and 14 are trained at one end about a double sheave 16 fixed on a rotatable shaft 17 carried by the frame end member 10 and about a double sheave 18 on a shaft 19 carried by the opposite frame end member 11. Although the present machine could be driven off the conveyor drive shaft, in the illustrated embodiment an electric motor 22 (FIGS. 2 and 3) or other suitable prime mover, is mounted adjacent the frame end 10 and is rotatably drivingly connected to a drive pulley 23 on the inner end of the aforementioned shaft 17 by means of a pair of belts 24, thereby providing means for driving said endless V-belts 12 and 14. In place of said drive belts 24, a gear drive arrangement could be employed, of course, and in the preferred form of the invention, a cover or housing is mounted over said drive mechanism to protect the operator from injury. An electrical control switch 25 (FIG. 1) may be located either adjacent the motor, as shown, or at any other convenient location to permit the operator to actuate the machine and to regulate the speed thereof.

While the various shaft bearings and journals have not been shown in detail in the drawings, it is preferred to use completely sealed, self-lubricating units, to minimize servicing requirements, but the invention is not to be limited in this respect. Similarly, it is to be understood that the complete machine hereinafter described is merely intended to be illustrative of a device incorporating the novel features and concepts comprising the present invention and the invention is not to be limited or confined to a machine necessarily constructed exactly as that hereinafter described.

As shown in FIG. 1, the upper end portion of the frame end member 11 in the illustrated embodiment of the invention is inverted L-shaped in form, having a forwardly-extending, horizontal arm portion 11', and threaded therethrough is an elongated vertical shaft 26 having a hand adjustment wheel 27 and a locking wheel 28, mounted thereon. The opposite end member 10 of the frame is provided with a similar threaded vertical shaft 30, adjustment wheel 31, and locking wheel 33.

A frame horizontal support bar 34 is mounted on and between said end member threaded vertical shafts 26 and 30, and in the use of the present unit, said support bar is bolted or welded to a crossbar or other suitable portion of the endless conveyor frame 35 (FIGS. 2 and 5). The result is that the entire cleaning unit is suspended from and completely supported above the floor or ground by the conveyor frame. In place of the elongated support bar 34 illustrated, it may be necessary with some conveyor frames to utilize individual support brackets at each end of the machine, in order to secure the same to said frame, but the particular mounting assemblage employed is not critical. After the machine has been mounted on the conveyor frame as described, the adjustment wheels 27 and 31 are turned to raise the unit to a position where the rows of brushes 13 and 15 on the aforementioned V-belts 12 and 14 abut the underside of the lower flight of the endless conveyor belt 36 (FIGS. 2 and 5). The lock wheels 28 and 33 are then turned to clampingly retain said cleaning unit in its adjusted position. It has been found that from time to time it is desirable to elevate the cleaning unit slightly, to compensate for unavoidable wear on the brushes, and the vertically-adjustable nature of the present machine is important in this respect.

In addition to the vertical positioning and adjustment means described, the present machine is also provided with means for adjusting the tension on the V-belts 12 and 14, to obtain the most effective cleaning action with respect to the particular conveyor being cleaned. In this regard, attention is directed to FIGS. 2 and 3 of the drawings. It will be seen that sheave 18 adjacent the frame end member 11 is carried by a bracket or carriage 37 which is longitudinally slidably mounted on the crossbars 20 and 21. Threaded through the frame end member 11 and rigidly secured to said movable bracket 37, is a horizontal screw shaft 38 and fixed on the outer end of said screw shaft is a wheel 39 and locking handle 40. Through said threaded shaft 38, and hand wheel 39, said bracket 37 may be shifted longitudinally to move the sheave 18 either toward or away from the opposite end 10 of the frame, thus either increasing or decreasing the slack in the V-belts. When the proper tension is obtained, the locking handle 40 is adapted to be turned inwardly to clampingly maintain said sheave-supporting bracket in its selected position of adjustment.

Another important feature of said slidable sheave mounting bracket 37 is that when it is moved inwardly a sufficient distance, the V-belts 12 and 14 may be easily slipped from their sheave mountings, thus permitting the quick and simple replacement of said belts in the event they are damaged, or when the brushes thereon become worn.

As is best shown in FIGS. 2 and 4, mounted in spaced relationship along the longitudinal crossbars 20 and 21, intermediate the frame end members 10 and 11, are a plurality of vertical supports 41. A rotatable idler pulley or roller 42 is vertically adjustably mounted on each of said supports 41, said rollers being positioned to support the upper flights of the V-belts 12 and 14. As shown, each of said roller assemblies includes an integral back member which is provided with a pair of vertical slotted openings 43 through which the bolts 44 securing the same to said support members 41 are projected, the slotted nature of said openings permitting said rollers 42 to be adjusted vertically on their supports. Said adjustable roller assemblies are an optional feature on the machine and are designed to permit the upper flight of the V-belts 12 and 14 to be raised to conform to the normally concave cross-sectional contour of the conveyor belt 36, as illustrated in FIG. 2 and as will be hereinafter discussed in connection with the operational description of the invention.

With respect now to the brushes which are mounted in the V-belts in the preferred form of the present invention, it will be seen in FIG. 7 that each of the bristles 13 is extended completely through the V-belt and is then bent slightly less than 180 degrees and projected upwardly through the belt material again, thus actually forming two upstanding bristles. Approximately a dozen bristles are mounted in a group or brush and similar brushes are spaced an inch or two apart around the entire circumference of the belt, the underside of said belt containing stitching 13' (FIGS. 1 and 7) which secures said bristles thereto and to the bristles of the adjacent brush. As shown, the upper portions of said bristle groups diverge somewhat to present an almost-solid brush surface engaging the conveyor belt. Preferably, said brushes are formed of nylon and those carried by the belt 12 are relatively stiff, or so-called "rough" cleaning brushes, while the brushes 15 on the other V-belt are of a more flexible, so-called "finish" cleaning type, the purpose of which will be hereinafter described.

In the use of the novel machine comprising the present invention, the unit is positioned with the upstanding end members 10 and 11 straddling the conveyor belt to be cleaned, and the horizontal support bar 34 or other support members bolted or otherwise securely attached to a crossbar or other suitable portion of the conveyor frame 35 (FIGS. 2 and 5). The illustrated machine is thus supported by and suspended from the conveyor frame in spaced relation above the ground, although it is appreciated that with some conveyor designs the cleaning unit could as well be rested on the ground, so long as it is vertically adjustable relative to the conveyor. The hand wheels 27 and 31 are then turned to raise the unit, through the elevating screw assemblies 26 and 30, to a point where the cleaning brushes 13 and 15 firmly engage the underside of the conveyor belt lower flight across its entire width. Because the opposite end members 10 and 11 of the unit can be raised independently as described, it is possible to compensate for horizontal deviations in the conveyor, and to always obtain perfect alignment therewith. In the event the conveyor belt 36 is concave in cross section, as frequently occurs and as is shown in FIG. 2, the rollers 42 may be raised as required to ensure that the upper flight of the cleaner V-belts 12 and 14 conform to the shape of said conveyor belt.

When the cleaning unit has thus been properly positioned relative to the underside of the conveyor belt, the locking wheels 26 and 33 are turned to clampingly retain the same in said position. In addition, in the preferred form of the invention, and as illustrated in FIG. 6, one or more adjustable, positioning and stabilizing straps 45 may be mounted on and between the cleaner frame and the conveyor frame 35 and adjusted and set to maintain said members properly positioned relative to each other. The machine is then ready for use.

As hereinabove described, the novel cleaning device comprising the present invention is designed to function while the endless conveyor is in operation. For the purpose of illustration, a belt-type endless conveyor has been shown in FIG. 5, there being ore 46 or the like on and being conveyed by the upper flight of the belt 36 in the direction indicated by the arrows, said ore being automatically or manually removed somewhere along the line prior to the return flight of said belt. When the machine comprising the present invention is mounted on said conveyor as shown, and the motor 22 is turned on, the V-belts 12 and 14 are driven in a path which is transverse to the path of the conveyor belt, the brushes on said V-belts pressurably engaging and moving across the underside of said conveyor lower flight to disengage the ore or other residual matter adhering thereto.

As mentioned, in the preferred form of the invention, the brushes on the outer V-belt 12 are formed of relatively stiff bristles and are designed to function as "rough" cleaners to loosen and remove the bulk of the residual material adhering to the conveyor belt. The brushes 15 on the inner V-belt 14, which contacts the surface of the moving conveyor belt after the same has been rough cleaned by the aforementioned brushes 13, are of a softer, more flexible type and are designed to function as "finish" cleaners, removing any residual material loosened but not disengaged by the brushes 13, and ensuring that the belt surface is completely smooth and clean. As is shown in said FIG. 5, the ore or other residual material 46' removed from the conveyor belt by the cleaning brushes is deposited at a single location on the ground, or in a receptacle, where it can be easily collected and removed.

It is to be understood, of course, that while two rows of brushes have been illustrated, one a "rough" cleaner and the other a "finish" cleaner, the invention is not to be limited to such a combination. It is contemplated, for example, that more than two belts might be preferred, or that a single V-belt having a row of brushes mounted therein might perform satisfactorily for some operations. It is possible, too, that for some uses a flat belt or similar flexible member might be used in place of the illustrated V-belts, which type of belt would be less efficient but cheaper, and in some instances it might be satisfactory to use the belt itself as the cleaning member, thus eliminating the necessity for mounting brushes therein. In short, while the specific form of the invention illustrated in the drawings and hereinabove described has been found to perform its intended function very effectively, the essence of the invention is the provision of a continuous movable cleaning member which engages and moves transversely to the moving conveyor belt, the transverse force applied thereby overcoming the adhesion force holding residual matter on the conveyor belt, and the particular design of said cleaning member is not necessarily critical to the invention in its broadest aspect.

From the foregoing detailed description it will be seen that the present invention provides a novel machine for cleaning endless belt or slat type conveyors which has several important advantages over the cleaning devices now in use. The present invention provides a novel machine which is adapted not only to do a more thorough cleaning job, but which is so designed that it does not require the application of undue pressure, and will not damage the conveyor belt. Moreover, the present machine can be utilized while the conveyor is in operation, thus avoiding costly delays. The device is also relatively inexpensive both in design and operation, and is of strong, durable construction which is well adapted to stand up under rugged use in mines, mills, refineries, and similar operations wherein endless conveyors are employed.

With the above in mind, it is intended that the present invention include the embodiment illustrated and hereinbefore described, and any and all modifications or changes therein as may come within the spirit of the invention and within the scope of the following claims.

What I claim is:

1. In a cleaning apparatus for an endless conveyor belt, said cleaning apparatus having a frame positioned transversely beneath the conveyor belt, having an endless flexible cleaner belt carried by said frame beneath the lower run of the conveyor belt and positioned to move transversely across the path of the conveyor, having means for driving said endless cleaner belt, having a plurality of brushes mounted in and projecting from said cleaner belt, and having means to horizontally adjust said cleaner belt, the improvements comprising: independently vertically-adjustable cleaner belt-supporting means on each end of said frame, the independently adjustable nature of said supporting means permitting the adjustment of the plane of said cleaner belt to compensate for deviations in the transverse plane of the conveyor belt from the horizontal; and a plurality of supporting members on said frame independently vertically-adjustably supporting the upper run of said cleaner belt intermediate its length, the independently adjustable nature of said supporting members permitting the positioning of said cleaner belt upper run to conform to the cross sectional contour of said conveyor belt lower run.

2. In a cleaning apparatus for an endless conveyor belt, said cleaning apparatus having a frame positioned transversely beneath the conveyor belt, having a first endless flexible cleaner belt carried by said frame beneath the lower run of the conveyor belt and positioned to move transversely across the path of the conveyor, having means for driving said endless cleaner belt, having a plurality of brushes mounted in and projecting from said cleaner belt, and having means to horizontally adjust said cleaner belt, the improvements comprising: a second endless cleaner belt carried by said frame adjacent and parallel said first cleaner belt and drivable therewith; a plurality of brushes mounted in and projecting from said second cleaner belt, said brushes being of a different coarseness than the brushes mounted in said first cleaner belt; independently vertically-adjustable cleaner belt-supporting means on each end of said frame, the independently adjustable nature of said supporting means permitting the adjustment of the plane of said cleaner belts to compensate for deviations in the transverse plane of the conveyor belt from the horizontal; and a plurality of supporting members on said frame independently vertically-adjustably supporting the upper runs of said cleaner belts intermediate their lengths, the independently adjustable nature of said supporting members permitting the positioning of said cleaner belt upper runs to conform to the cross sectional contour of said conveyor belt lower run.

References Cited in the file of this patent

UNITED STATES PATENTS

| | | |
|---|---|---|
| 1,633,216 | Lakeman | June 21, 1927 |
| 2,524,928 | Platz | Oct. 10, 1950 |

FOREIGN PATENTS

| | | |
|---|---|---|
| 349,649 | Great Britain | June 4, 1931 |